US009507614B2

(12) United States Patent
Maheshwari et al.

(10) Patent No.: US 9,507,614 B2
(45) Date of Patent: *Nov. 29, 2016

(54) METHOD AND SYSTEM FOR PRESENTING AND MANAGING STORAGE SHARES

(71) Applicant: NETAPP, INC., Sunnyvale, CA (US)

(72) Inventors: Nilesh P. Maheshwari, Mountain View, CA (US); Robert M. Armitano, Palo Alto, CA (US); Sreenivasa Potakamuri, Sunnyvale, CA (US); Yinzen Hwang, Fremont, CA (US)

(73) Assignee: NETAPP, INC., Sunnyvale, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/097,548

(22) Filed: Dec. 5, 2013

(65) Prior Publication Data

US 2015/0033224 A1    Jan. 29, 2015

Related U.S. Application Data

(60) Provisional application No. 61/857,793, filed on Jul. 24, 2013.

(51) Int. Cl.
*G06F 9/455* (2006.01)
*G06F 3/06* (2006.01)
*G06F 9/50* (2006.01)

(52) U.S. Cl.
CPC ......... *G06F 9/45533* (2013.01); *G06F 3/0605* (2013.01); *G06F 3/067* (2013.01); *G06F 3/0644* (2013.01); *G06F 3/0664* (2013.01); *G06F 9/5011* (2013.01); *G06F 9/5016* (2013.01)

(58) Field of Classification Search
None
See application file for complete search history.

(56) References Cited

U.S. PATENT DOCUMENTS

| 7,269,696 B2 * | 9/2007 | Muhlestein | H04L 63/10 709/215 |
| 7,730,428 B1 * | 6/2010 | Yehuda | G06F 3/0605 715/853 |

(Continued)

OTHER PUBLICATIONS

Office Action received for U.S. Appl. No. 14/097,520, mailed Jul. 23, 2015, 14 pages.

(Continued)

*Primary Examiner* — Hiren Patel
(74) *Attorney, Agent, or Firm* — Klein, O'Neill & Singh, LLP

(57) ABSTRACT

Methods and systems for managing storage shares in a virtual environment having a plurality of virtual machines are provided. The system includes a storage system for managing storage space for the storage shares and generating a quota report. The quota report shows an assigned quota for each storage share and actual storage used by each storage share. The assigned quota indicates an amount of designated storage space for each storage share. The system also includes a storage provider for obtaining the quota report from the storage system and filtering the quota report based on storage shares that are managed by the storage provider. The storage provider modifies a quota for a storage share based on a client request and notifies the storage system of the modification.

19 Claims, 13 Drawing Sheets

(56) References Cited

U.S. PATENT DOCUMENTS

| | | | |
|---|---|---|---|
| 7,734,951 B1* | 6/2010 | Balasubramanian | G06F 11/1435 714/15 |
| 7,739,614 B1* | 6/2010 | Hackworth | G06F 11/3495 715/771 |
| 7,849,112 B2* | 12/2010 | Mane | G06F 17/30067 707/823 |
| 7,853,744 B2* | 12/2010 | Mahalingam | G06F 9/4812 710/262 |
| 7,958,097 B1* | 6/2011 | Tormasov | G06F 17/30147 707/694 |
| 8,046,378 B1* | 10/2011 | Zhuge | G06F 17/30082 707/783 |
| 8,078,816 B1* | 12/2011 | Thoppai | G06F 17/30215 711/162 |
| 8,131,784 B1* | 3/2012 | Zhuge | G06F 17/30073 707/823 |
| 8,171,201 B1* | 5/2012 | Edwards, Sr. | G06F 9/45558 711/112 |
| 8,266,136 B1* | 9/2012 | Pogde | G06F 17/30091 707/711 |
| 8,396,807 B1* | 3/2013 | Yemini | G06Q 10/06 705/400 |
| 8,463,825 B1* | 6/2013 | Harty | G06F 17/30233 707/813 |
| 8,688,645 B2* | 4/2014 | Sadhwani | G06F 11/1469 707/681 |
| 8,751,515 B1* | 6/2014 | Xing | G06F 17/30073 707/755 |
| 8,832,687 B2* | 9/2014 | Baron | G06F 9/45558 709/226 |
| 8,924,364 B1 | 12/2014 | Zhong et al. | |
| 8,954,381 B1* | 2/2015 | Naamad | G06F 3/0685 707/609 |
| 9,158,458 B2* | 10/2015 | Umbehocker | G06F 9/5016 |
| 9,323,459 B1* | 4/2016 | Marshak | G06F 3/0685 |
| 9,336,222 B2* | 5/2016 | Pn | G06F 17/30138 |
| 2002/0019908 A1* | 2/2002 | Reuter | G06F 3/0605 711/112 |
| 2002/0152339 A1 | 10/2002 | Yamamoto | |
| 2004/0181476 A1 | 9/2004 | Smith et al. | |
| 2005/0050107 A1* | 3/2005 | Mane | G06F 17/30067 |
| 2005/0138162 A1* | 6/2005 | Byrnes | H04L 29/06 709/223 |
| 2005/0262505 A1* | 11/2005 | Esfahany | G06F 9/5077 718/1 |
| 2006/0075191 A1 | 4/2006 | Lolayekar et al. | |
| 2006/0195715 A1* | 8/2006 | Herington | G06F 9/5077 714/4.2 |
| 2008/0140877 A1* | 6/2008 | Baba | G06F 9/5011 710/23 |
| 2008/0155223 A1* | 6/2008 | Hiltgen | G06F 9/45558 711/173 |
| 2009/0083511 A1* | 3/2009 | Kanda | G06F 3/0604 711/173 |
| 2010/0106933 A1* | 4/2010 | Kamila | G06F 3/0605 711/171 |
| 2011/0145403 A1* | 6/2011 | Swartzlander | H04L 67/1097 709/224 |
| 2011/0184993 A1 | 7/2011 | Chawla et al. | |
| 2012/0066179 A1* | 3/2012 | Saika | G06F 3/061 707/634 |
| 2012/0096059 A1* | 4/2012 | Shimizu | G06F 3/061 707/828 |
| 2012/0166751 A1* | 6/2012 | Matsumoto | G06F 3/0608 711/170 |
| 2012/0263191 A1* | 10/2012 | Baron | H04L 67/1097 370/462 |
| 2012/0272237 A1* | 10/2012 | Baron | G06F 9/45558 718/1 |
| 2013/0298122 A1* | 11/2013 | Rangegowda | G06F 9/5088 718/1 |
| 2014/0007097 A1* | 1/2014 | Chin | G06F 9/45533 718/1 |
| 2014/0013069 A1* | 1/2014 | Mitsuno | G06F 3/0605 711/162 |
| 2014/0136491 A1* | 5/2014 | Nemoto | G06F 3/0641 707/692 |
| 2014/0380307 A1* | 12/2014 | Zhu | G06F 9/45533 718/1 |
| 2015/0032954 A1* | 1/2015 | Maheshwari | G06F 3/0665 711/114 |
| 2015/0326432 A1* | 11/2015 | Fujie | G06F 9/445 709/222 |

OTHER PUBLICATIONS

Storage Management Technical Specification, Overview, Version 1.6.0, Revision 4, SNIA, United States of America, Feb. 10, 2012.
Non-Final Office Action on co-pending U.S. Appl. No. 14/097,520 dated Apr. 25, 2016.
Final Office Action mailed Aug. 25, 2016, for U.S. Appl. No. 14/097,520.

\* cited by examiner

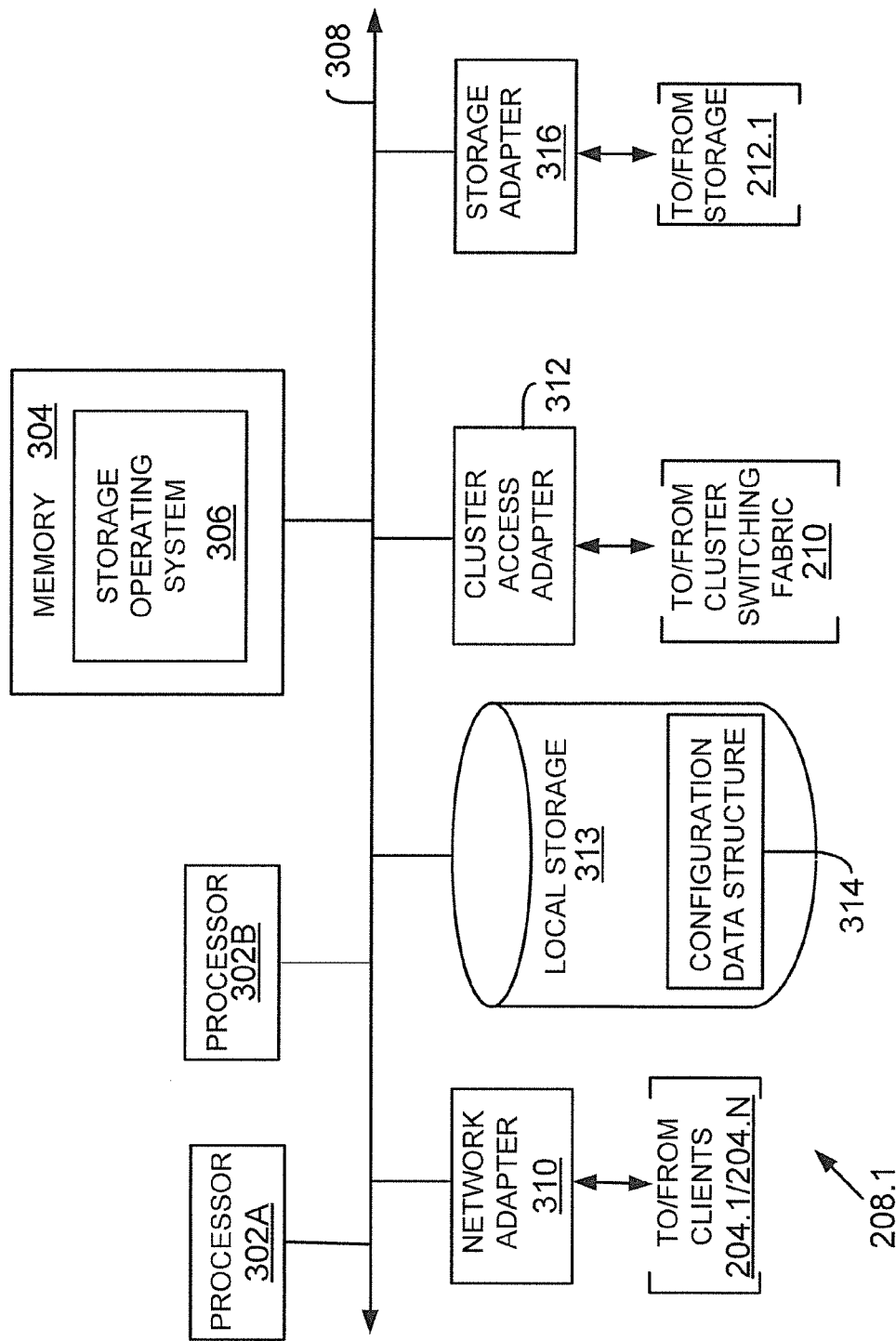

METHOD AND SYSTEM FOR PRESENTING AND MANAGING STORAGE SHARES

CROSS REFERENCE TO RELATED APPLICATIONS

This patent application claims priority under 35 USC §119(e) to U.S. Provisional Patent Application Ser. No. 61/857,793, filed on Jul. 24, 2013, the disclosure of which is incorporated herein in its entirety.

TECHNICAL FIELD

The present disclosure relates to presenting and managing storage for a virtual machine environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in virtual environments where a physical resource is time-shared among a plurality of independently operating processor executable virtual machines. Typically, storage space is presented to a virtual machine as a virtual hard disk (VHD) file. A storage drive (for example, C:\) is then presented to a user via a user interface within a virtual machine context. The user can use the storage drive to access storage space to read and write information. Continuous efforts are being made for efficiently presenting and managing storage space in a virtual environment.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures:

FIGS. 2C and 2E-2K show process flow diagrams for presenting and managing storage shares for virtual machines, according to one aspect;

FIG. 3 shows an example of a storage system, according to one aspect;

DETAILED DESCRIPTION

Figure 1A:
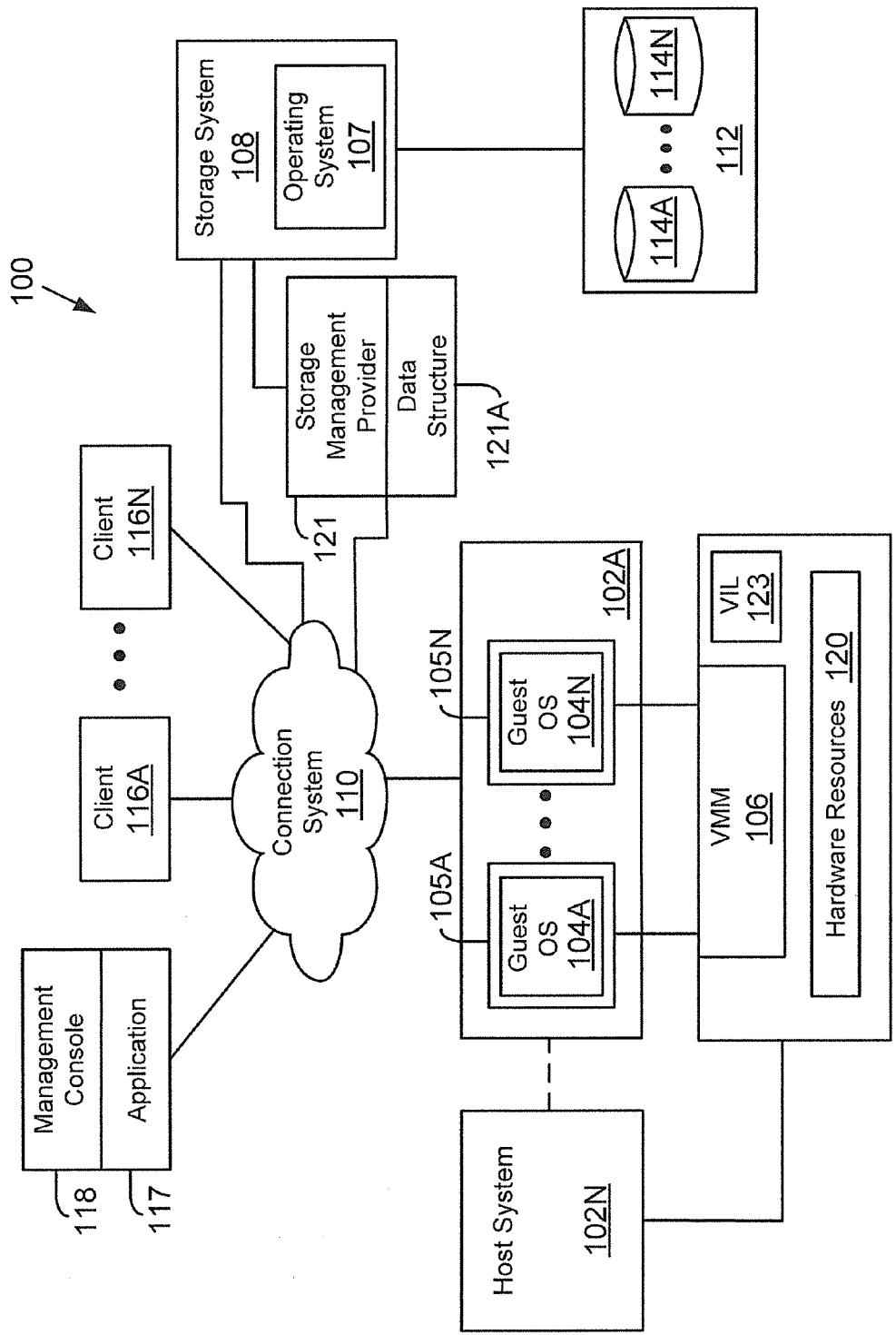
FIG. 1A shows an example of an operating environment for the aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for presenting storage shares in a virtual environment having a plurality of virtual machines are provided. A hierarchical data structure is maintained by a storage provider interfacing with a storage system that manages storage space for the storage shares. The data structure stores information for a storage pool based on the storage space and information for a storage volume sub-unit that is based on the storage pool. The storage provider assigns a storage share to a management console either based on the storage pool or the storage volume sub-unit. The management console then presents the storage share to a virtual machine from among the plurality of virtual machines.

In another aspect, methods and systems for managing storage shares in a virtual environment having a plurality of virtual machines are provided. The system includes the storage system for managing storage space for the storage shares and generating a quota report. The quota report shows an assigned quota for each storage share and actual storage used by each storage share. The assigned quota indicates an amount of designated storage space for each storage share. The system also includes the storage provider for obtaining the quota report from the storage system and filtering the quota report based on storage shares that are managed by the storage provider. The storage provider modifies a quota for a storage share based on a client request and notifies the storage system of the modification.

System 100:

FIG. 1A shows an example of a system 100, where the adaptive aspects disclosed herein may be implemented. System 100 includes a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, system 100 may include a plurality of computing systems 102A-102N (may also be referred to individually as a host platform/system 102 or server 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

Host platform 102 includes a processor executable virtual execution environment executing a plurality of VMs 105A-105N. VMs 105A-105N execute a plurality of guest OS 104A-104N (may also be referred to as guest OS 104) that share hardware resources 120. As described above, hardware resources 120 may include CPU, memory, I/O devices, storage or any other hardware resource.

In one aspect, host platform 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 123 that provides one or more virtualized hardware resource to each OS 104A-104N.

In one aspect, VMM 106 is executed by host platform 102 with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1A may be customized depending on the virtual environment provider to implement the aspects of the present disclosure. Furthermore, VMM 106 may execute other modules, for example, a storage driver, network interface and others, the details of which are not germane to the various aspects described herein and hence have not been described in detail.

System 100 may also include a management console 118 that executes a processor executable management application 117 for managing and configuring various elements of system 100. In a Microsoft Corporation virtual environment, the management console 118 may be referred to as virtual machine management module. Application 117 may be used to manage and configure VMs as well as configure resources that are used by VMs, according to one aspect. Application 117 interfaces with a storage management provider 121 (may also be referred to as storage provider 121), VMM 106 and other modules. Storage provider 121 maintains one or more data structures (121A) for presenting and managing storage space for various VMs, according to one aspect. Details regarding the storage provider 121 and data structure 121A are provided below.

In one aspect, the storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (also interchangeably referred to as storage pools) to the storage provider 121 and other clients, for example, VMM 106, and clients 116A-116N. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 107 organizes storage space at storage devices 114 as one or more "aggregate", where each aggregate is identified by a unique identifier and a location. Within each aggregate, one or more flexible storage volumes are created whose size can be varied. A qtree, sub-volume unit may also be created within the storage volumes. As a special case, a qtree may be an entire storage volume.

A qtree enables a user to apply attributes (for example, security settings, oplocks (opportunistic locks) and others) to a subset of data containers and directories, rather than to an entire volume. A qtree typically does not have restrictions on the number of files or storage space. However, a "quota" can be applied to a qtree to limit its storage space size.

Figure 1B:
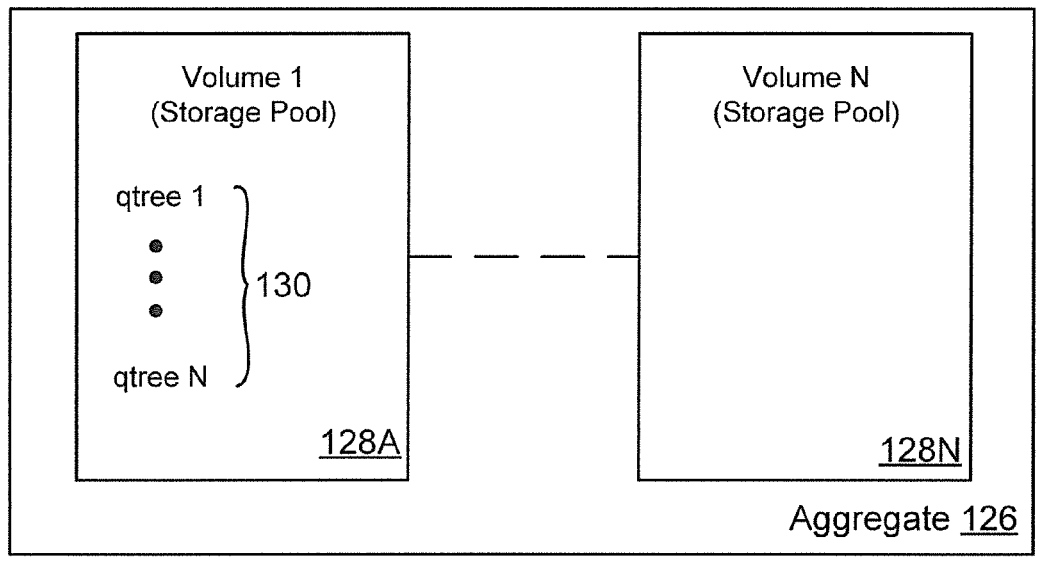
FIG. 1B shows an example of logically managing storage space, according to one aspect.

FIG. 1B shows an example of an aggregate 126 that is based on storage space at storage devices 114. Aggregate 126 includes a plurality of flexible volumes (or storage pools) 128A-128N. A flexible volume is a logical storage volume whose size may be increased and decreased, hence, the term flexible. A plurality of qtrees 130 is created within one storage volume, for example, Volume 128A. The storage operating system 107 can present or export data stored at storage devices 114 as a volume, or one or more qtree sub-volume units.

The storage system 108 may be used to store and manage information at storage devices 114 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (for example, a VM) transmits one or more input/output (I/O) commands, such as a CFS or NFS request, over connection system 110 to the storage system 108. Storage system 108 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2A.

When the CIFS protocol is used for accessing storage space, then storage space at storage devices 114 is exposed as a CIFS "share". CIFS is a protocol that defines a standard for remote data container access by a plurality of computing devices. With CIFS, users with different platforms and computers can share files without having to install new software. CIFS runs over TCP/IP but uses the SMB (Server Message Block) protocol available in Microsoft Windows operating environments for data container access.

A CIFS share is typically defined by a share name that can be accessed by a SMB client to access storage. A CIFS share also includes a storage path that is maintained by storage system 108. In one aspect, a CIFS share may be exposed as a qtree sub-volume unit by the storage provider 121, as described below in detail. Permissions associated with the qtree may be defined in an access control list (ACL). A quota for the CIFS share may also be assigned by the storage provider 121 and may be used to define the size for the share.

In one aspect, the CIFS share may be based on a qtree or a flexible storage volume (storage pool), where the storage pool size can be increased or decreased based on storage usage, as described below in detail. In another aspect, as described below, a CIFS share may be thin provisioned. This means that more storage space may be presented to a client than what may be available for a storage pool. For example, if a storage pool is configured with storage space of 100 Gb, the storage provider 121 may expose six different shares of 20 Gb which exceeds the total storage space of 100 Gb. The actual storage for the shares may be allocated on an as need basis. The size of the shares may be increased or decreased, as described below in detail.

Figure 1C:
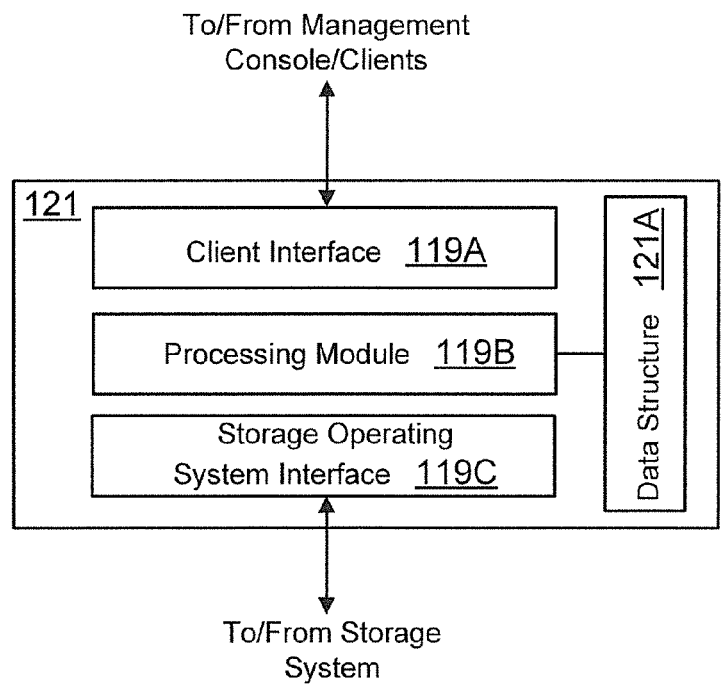
FIG. 1C shows an example of a storage provider that presents and manages storage shares, according to one aspect.

Storage Provider 121:

FIG. 1C shows a block diagram of the storage provider 121 that interfaces with the management console 118 via a client interface module 119A and with storage system 108 via a storage operating system interface 119C, according to one aspect. Interface 119A and 119C include logic and application programming interfaces (APIs) to communicate with the storage operating system 108 and management console 118. In one aspect, the storage provider 121 uses and complies with the SMI-S(Storage Management Initiative Specification) protocol for interfacing with storage operating system 107 and other components of system 100.

A processing module 119B maintains the data structure 121A, according to one aspect. The data structure 121A is used to expose CIFS shares and manage storage space. The data structure 121A may be stored at any location accessible to the processing module 119B. Details of data structure 121A are provided below with respect to FIG. 2B.

Figure 1D:
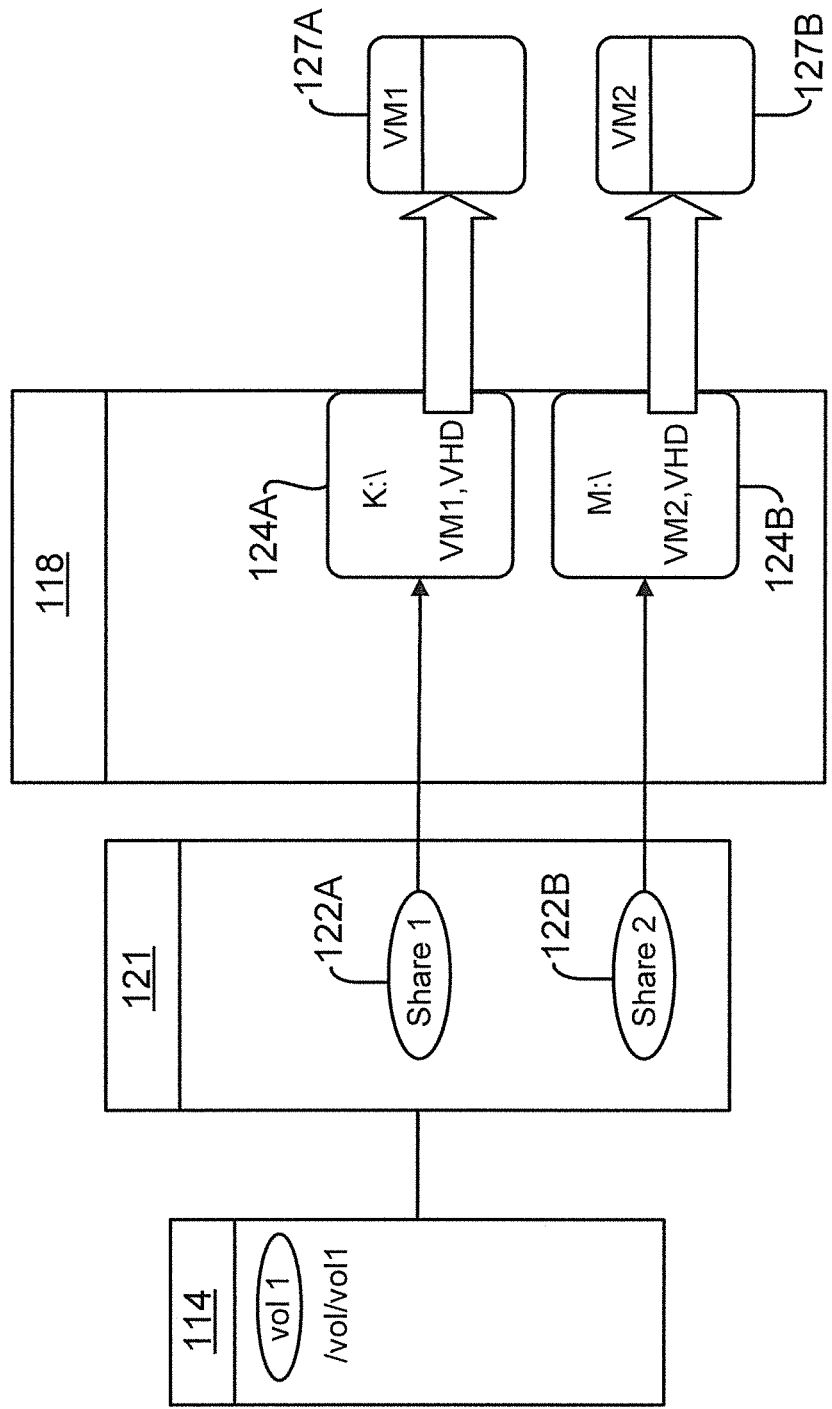
FIG. 1D shows an example of presenting shares to virtual machines, according to one aspect.

Exposing Shares:

FIG. 1D shows an example of presenting logical storage space to one or more virtual machines, according to one aspect. Storage system 108 typically presents storage space at storage device 114 as a storage pool or flexible volume (shown as /vol/vol1) to storage provider 121. The storage provider 121 creates shares 122A and 122B. Based on client request, the shares may be created on the storage pool itself or on qtree sub-volume units. The shares may be presented to management console 118 (or to VMM 106).

Management console 118 (or VMM 106) populates one or more virtual hard drive (VHD) files for each share. The user is presented with a storage drive within a virtual machine. For example, the VHD file VM1.VHD 124A is created on share 1 122A and then presented as drive K:\ to VM1 127A. A user using VM1 127A uses K:\ to access storage space for reading and writing information. Similarly, VM2.VHD 127B is created on share 2 122B and appears as M:\ drive for VM 127B. A user using VM2 127B uses M:\ drive to store information.

Figure 2A:
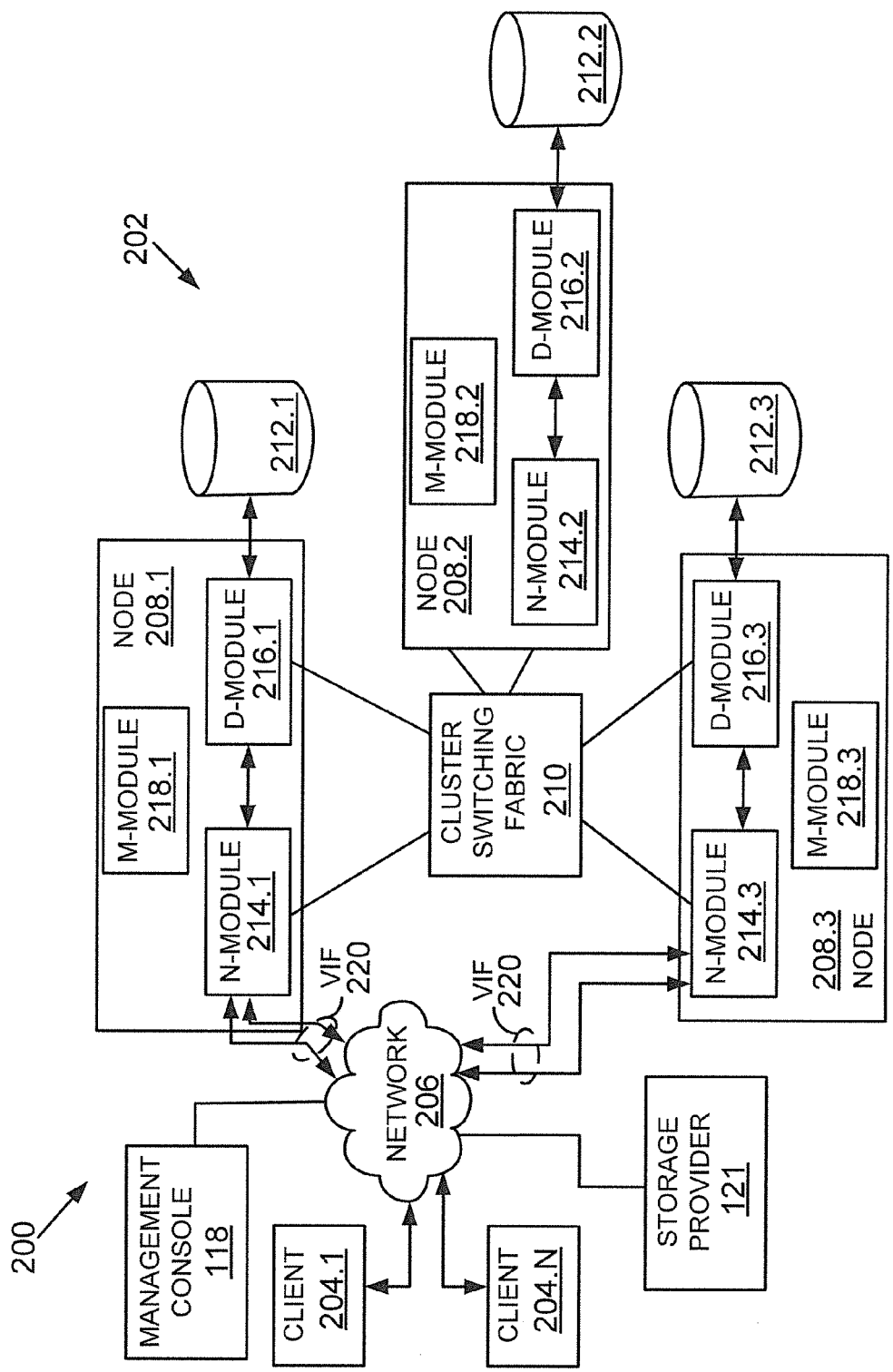
FIG. 2A shows an example of a clustered storage system, used according to one aspect.

Clustered System:

FIG. 2A shows a cluster based storage environment 200 having a plurality of nodes for managing storage devices, according to one aspect. Storage provider 121 interfaces with various nodes in the storage environment 200 for maintaining data structure 121A, according to one aspect.

Storage environment 200 may include a plurality of client systems 204.1-204.N (or virtual machines 105A-105N), a clustered storage system 202 (similar to storage system 108), storage provider 116, management console 118 and at least a network 206 communicably connecting the client systems 204.1-204.N and the clustered storage system 202. As shown in FIG. 2A, the clustered storage system 202 includes a plurality of nodes 208.1-208.3, a cluster switching fabric 210, and a plurality of mass storage devices 212.1-212.3 (may be referred to as 212 and similar to storage device 114).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N (or the storage provider 121) over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212 and makes it available to storage provider 116, according to one aspect.

A switched virtualization layer including a plurality of virtual interfaces (VIFs) 220 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

Each client system 204.1-204.N (or VM 105A-105N) may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
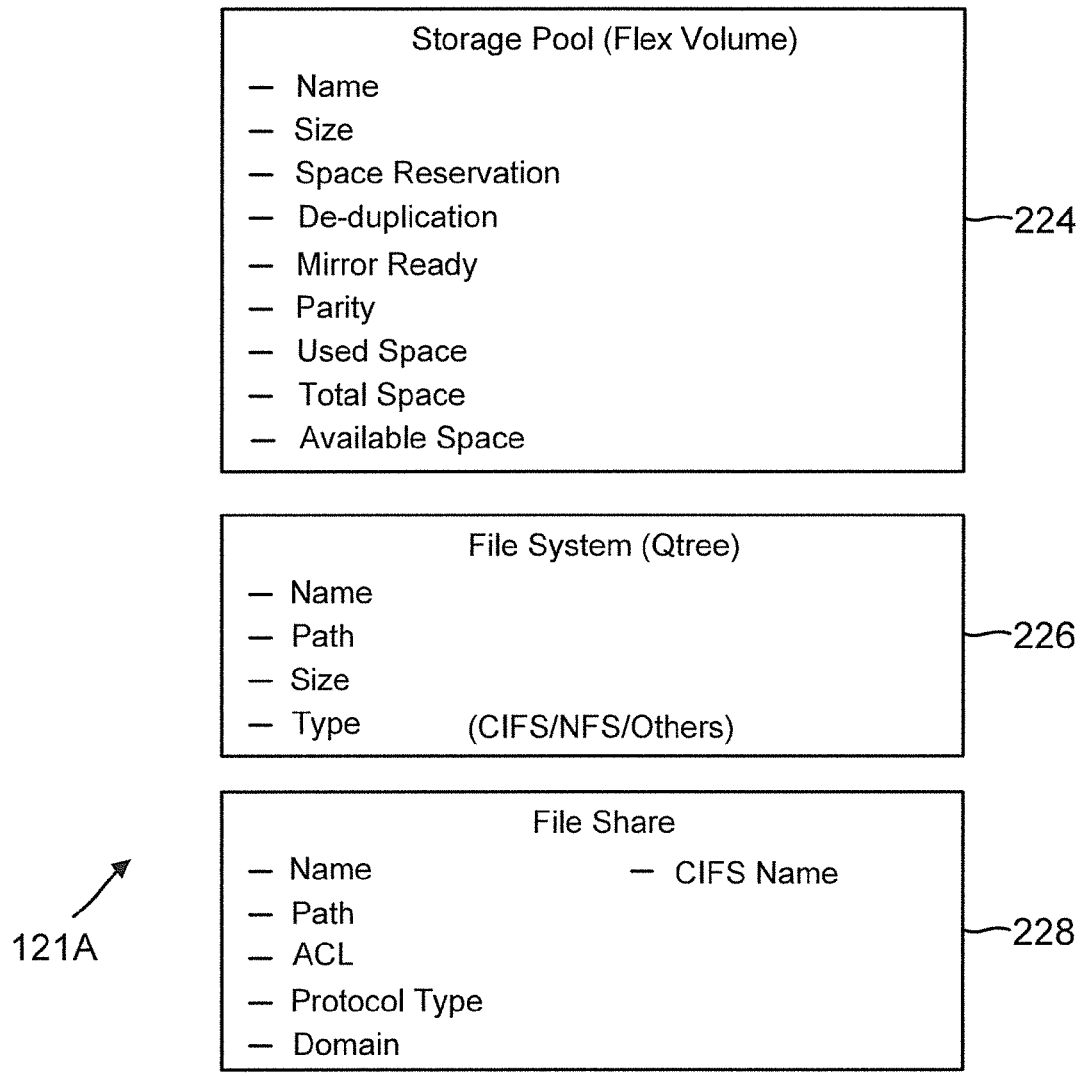
FIG. 2B shows an example of a hierarchical data structure used by the storage provider for managing and presenting storage shares, according to one aspect.

Data Structure 121A:

FIG. 2B shows a block diagram of the hierarchical data structure 121A maintained by storage provider 121, according to one aspect. Data structure 121A is based on information obtained from storage operating system 107 regarding storage pools maintained by the storage operating system 107 and storage pool utilization. The data structure 121A allows the storage provider 121 to expose CIFS shares either as a qtree or a storage pool providing flexibility to users, as described below in detail.

Data structure 121A includes information regarding a storage pool 224. The storage pool 224 information includes a unique name/identifier for identifying a flexible volume, a size and an indicator as to how space is allocated (shown as space reservation). The indicator indicates if storage space can be configured as a regular storage volume with fixed storage space size or as a thin provisioned storage volume whose size can vary. Data structure 121A also indicates other features for the storage pool 224, for example, if data de-duplication is enabled, parity features, if data mirroring is enabled or any other feature.

Data structure 121A also indicates the amount of space that is used for the storage pool, the amount of available space at any given time and the total storage space. The storage space usage information is obtained from storage operating system 107 that manages the underlying physical storage space for the storage pool 224 at storage devices 114 (or 212.1-212.3).

Data structure 121A also stores information for a qtree, shown as file system 226. File system 226 stores the name of the qtree, the path, size, file system type (for example, CIFS, NFS or others) and any other information.

Data structure 121A also stores information regarding a file share 228 that may be based on storage pool 224 or file system 226. The file share includes the file share name, a CIFS name, a storage path, ACL information, protocol type used to access the share and a network domain name to which the share is exposed.

The various elements of data structure 121A may be stored as separate storage objects or as an integrated storage object. The aspects disclosed herein are not limited to any particular format for data structure 121A.

In one aspect, the hierarchical elements of FIG. 2B may be categorized into different service levels, for example, Gold, Silver and Bronze. The service levels are used to enable certain amount of storage with certain features. For example, one service level may include de-duplication, mirroring, backup and other features, while another service level may have fewer features. The various aspects disclosed herein are not limited to any particular feature set or service level. The use of data structure 121A is described below in detail with respect to FIGS. 2C-2K.

Figure 2C:
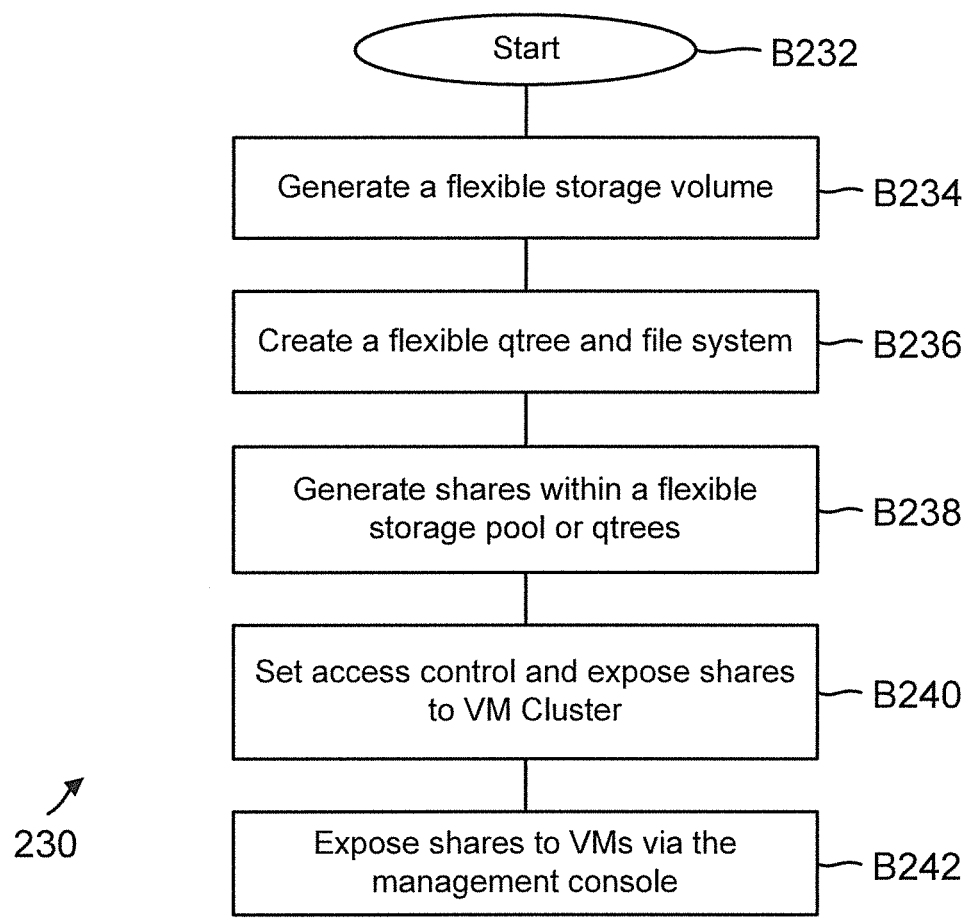

Process Flows:

FIG. 2C shows a process 230 for presenting a CIFS share, according to one aspect. The process steps may be executed by storage provider 121, management console 118 and storage system 108. The process begins in block B232 when the storage provider 121, management console 118 and storage system 108 are operational. A client request (for example, from management console 118 and/or a VM) for a CIFS share may be received by the storage provider 121.

In block B234, a flexible storage volume (for example, storage pool 224, FIG. 2D) is created to present storage as CIFS shares. The storage pool 224 is presented by the storage operating system 107 to storage provider 121. Information regarding the storage pool 224 that includes an identifier for the storage volume, a size, associated permissions and other attributes (for example, de-duplication abilities and others) is stored at the data structure 121A, described above. The storage pool 224 is configured to operate as a flexible storage volume when presented to clients i.e. the storage space presented to clients may be increased or decreased.

In block B236, the storage provider 121 creates a flexible qtree (or file system 226 (FIG. 2D) as referred to by the SMI-S specification). The qtree information is also stored at data structure 121A described above. In one aspect, the qtree may be thin provisioned, as described above.

In block B238, based on the client request, shares (228, FIG. 2D) are generated either based on the storage pool 224 or the qtree generated in block B226. The option of creating shares based on qtrees provides flexibility to clients, as to what they may want to do with the storage space. This allows the client to allocate logical storage containers based on a service level that defines how much storage and what storage attributes a client is permitted to use. This also allows a client to easily clone VMs because one simply has to create multiple qtrees for cloning VMs within the same file system i.e. flexible volume.

In block B240, permissions associated with the shares are set. The permissions may be stored as part of ACLs that are maintained by the storage operating system 107 and provided to the storage provider 121. The ACLs used by the storage provider 121 may be used across various network domains. Thereafter, the shares are exposed to the management console 118.

Figure 2D:
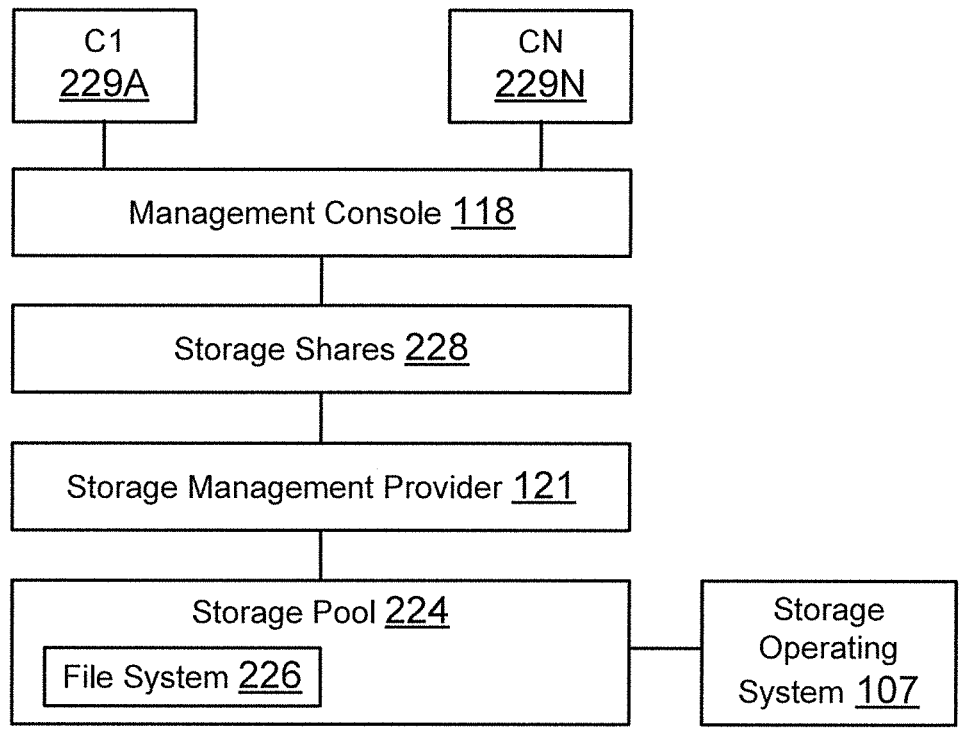
FIG. 2D show an example of presenting storage shares to virtual machines, according to one aspect.

In block B242, the management console 118 (or VMM 106) may present the shares (228, FIG. 2D) to multiple VMs as storage containers 229A-229N (FIG. 2D). The management console 118 with this technique has the option of exposing shares based on the needs of the overall network and virtual machine environment.

Figure 2E:
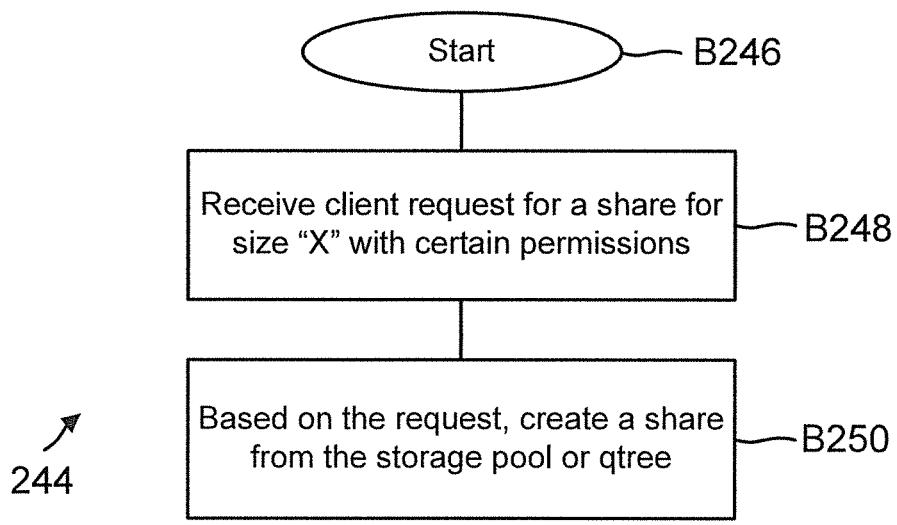

FIG. 2E shows a process 244 for providing shares based on a client request, according to one aspect. The process begins in block B246 when the storage provider 121 receives a client request for a share of certain size. The request may also specify certain permissions that need to be associated with the share. The request may be sent by management console 118.

In block B250, the storage provider 121 uses data structure 121A to create the share either from a storage pool (224, FIG. 2D) or a qtree (226, FIG. 2D). Thereafter, the shares are presented to the client. The client in this context may be the management console 118 (or application 117).

Figure 2F:
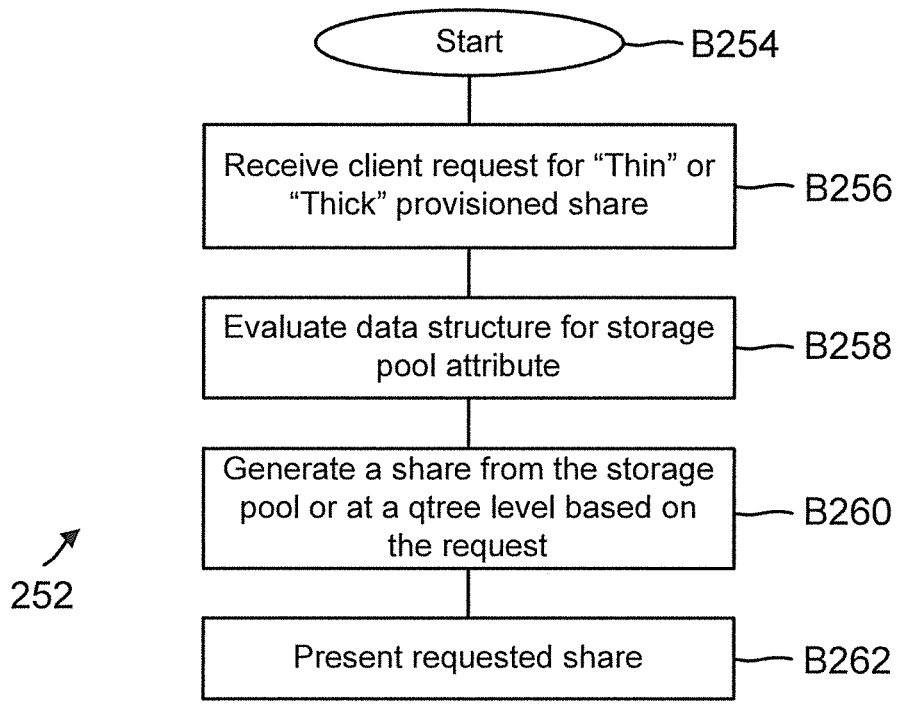

FIG. 2F shows a process 252 for managing shares by storage provider 121, according to one aspect. The process begins in block B254, when the various components of FIG. 1A (or 2A) are initialized and operational.

In block B256, the storage provider 121 receives a request for a thin or "thick" (i.e. fixed size) share. In block B258, the storage provider 121 evaluates data structure 121A to determine if the various storage pools and their attributes meet the requirements listed in the client request.

In block B258, depending on the client request, a share is generated based on the storage pool 224 or the file system 226. Thereafter, in block B262, the shares are presented to the client, for example, management console 118. It is noteworthy that the storage provider 121 performs the underlying calculations to ascertain which storage pool has enough storage to meet the requirements of the request. The storage provider 121 performs these calculations based on information received from the storage operating system 107.

Figure 2G:
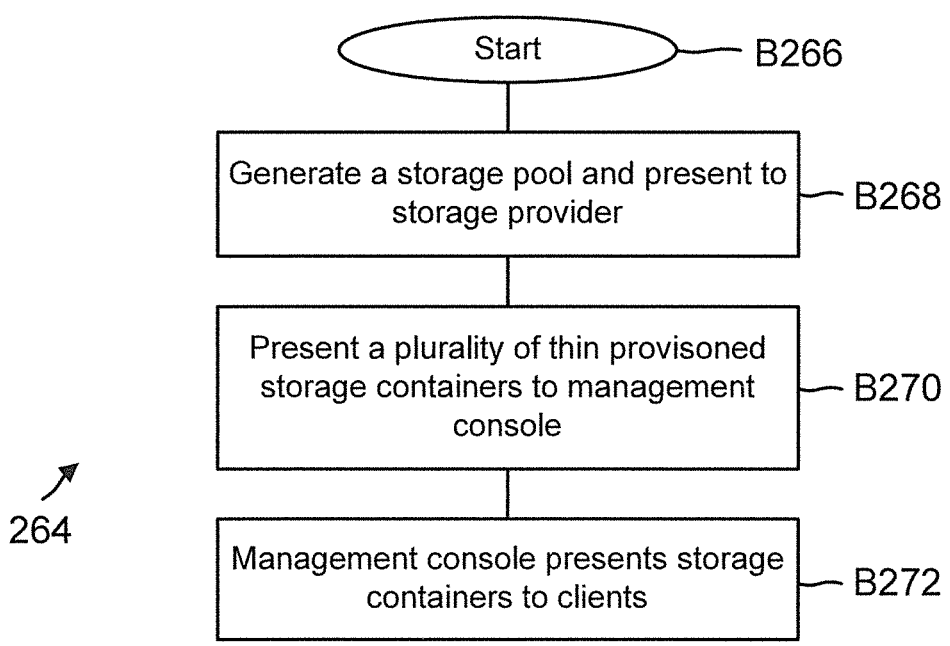

FIG. 2G shows a process 264 for presenting thin provisioned shares to management console 118, such that the management console 118 can present flexible storage containers to VMM 106 and eventually to clients/VMs. The process begins in block B266, when the various components of system 100 (or 200) are operational. In block B268, a storage pool 224 is created by storage operating system 107 and presented to storage provider 121.

In block B270, the storage provider 121 presents a plurality of thin provisioned storage containers (or shares) to management console 118. In block B272, the management console 118 presents the storage containers to VMM 106 and/or various clients, including VMs.

Figure 2H:
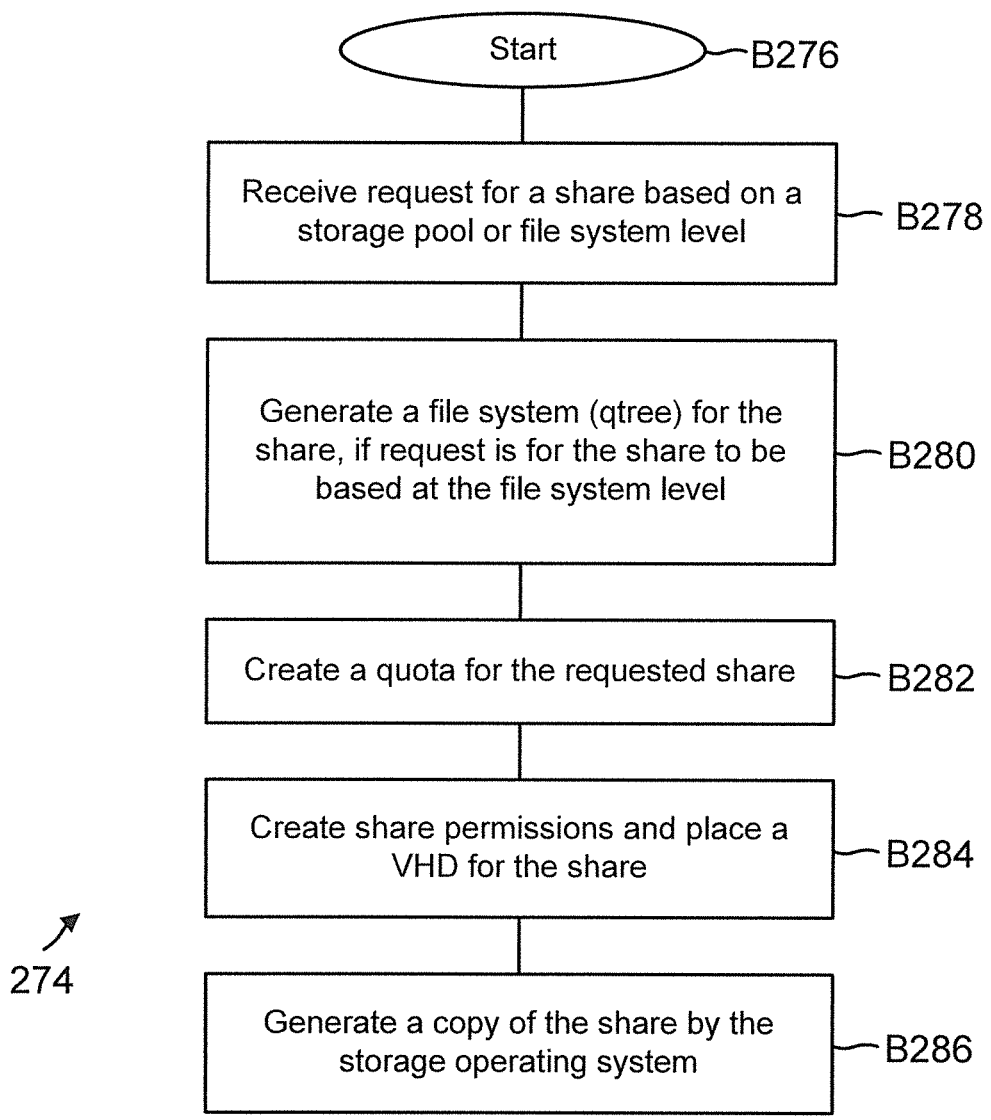
Figure 21:
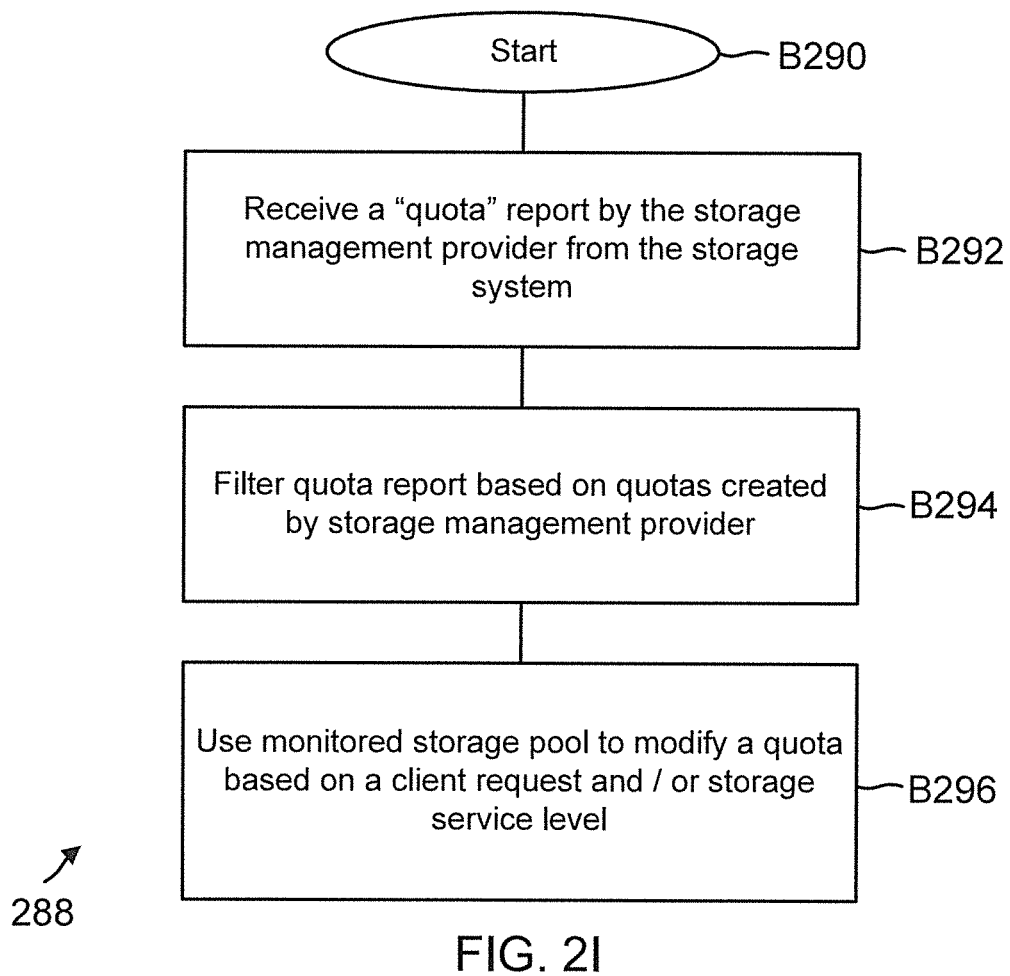

FIG. 2H shows a process 274 for managing shares and establishing quotas on shares, according to one aspect. The process begins in block B276, when the various modules of FIG. 1A (or 200) are operational and initialized. In block B278, a request for a share based either on a storage pool or a file system level is received by storage provider 121. The request may be sent by management console 118.

In block B280, a qtree (or file system) is generated for a storage pool, if the share is to be based at the file system level and not at the storage pool level.

In block B282, a quota for the requested share is created. The quota limits the size of the storage space for the share. Thereafter, in block B284, share permissions are created and the management console 118 places a VHD for the share. In another aspect, the VHD is placed by VMM 106. The copy of the share is created by the storage operating system 107 in block B286. This allows the storage operating system 107 to manage the physical storage space based on the assigned quota for the share.

FIG. 2I shows a process 288 for monitoring quotas by the storage provider 121, according to one aspect. The process begins in block B290, when the storage provider 121 is interfacing with storage system 108. In block B292, a "quota" report is received by the storage provider 121 from the storage operating system 107. The quota report is maintained by the storage operating system 107 so that it can manage storage space. The quota report identifies each storage share, assigned quota for each share and actual usage for each share.

The storage operating system 107 may assign shares to various clients that interface directly, instead of through the storage provider 121. Thus in block B294, the storage provider 121 filters the quota report to determine the actual storage space usage for the quotas that were assigned on shares managed by the storage provider 121.

If a client requests a modification for a quota (i.e. increase or decrease a quota), then in block B296, the quota may be modified based on the filtered results in block B294. The quota may also be modified based on a service level. For example, if a "gold" storage client that has access to more storage than a "silver client may have their quota increased (or decreased) based on the overall usage of storage space. A lower level storage user may also have their storage space increased or decreased depending on the filtered quota results.

Figure 2J:
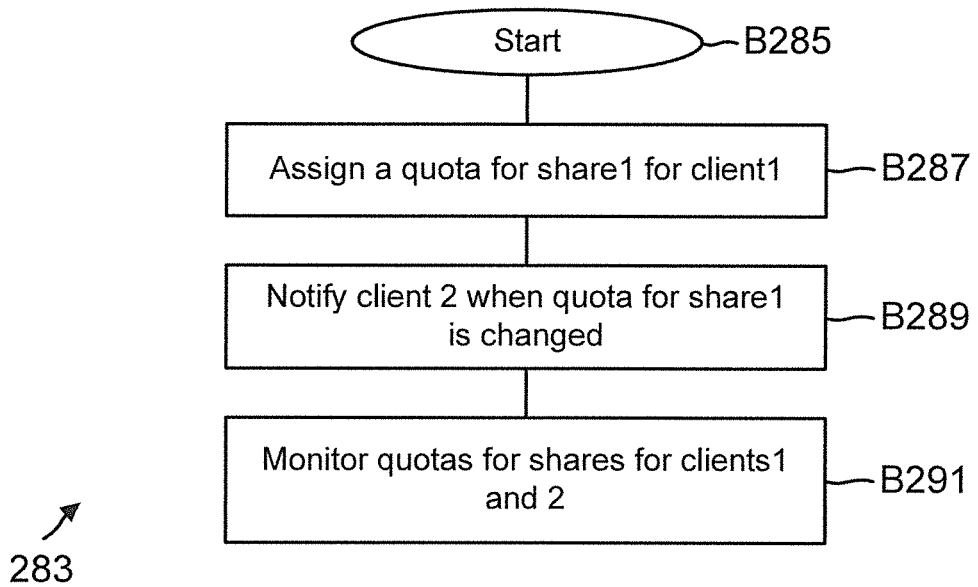

FIG. 2J shows a process 283 for notifying clients, when there is a change in a quota for one of the clients, according to one aspect. The process begins, in block 3285. In block 3287, a quota for share 1 for client 1 is assigned by the storage provider 121. In block B289, another client (client 2) is notified when the quota for share 1 is changed. In block B291, the quotas for both the clients are monitored and the clients are notified when either client has their share quotas increased or decreased. In one aspect, storage provider 121 notifies the management console 118 and the management console 118 notifies the individual VMs and/or VMM 106. The notification allows management console 118 to properly manage and allocate shares among VMs.

Figure 2K:
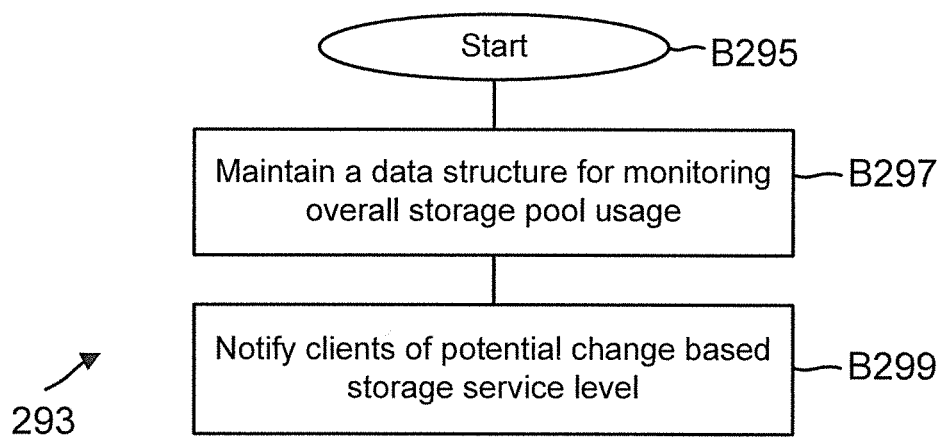

FIG. 2K shows a process 293 for monitoring quotas by the storage provider 121, according to one aspect. The process begins in block B295.

In block B297, the storage provider 121 maintains a data structure (for example, 121A) for monitoring overall storage pool usage. This information is obtained periodically from the storage operating system 107. If there is any change in the quotas and storage pool usage based on the service level of a client, then the clients are notified in block B299. As mentioned above, storage provider 121 may notify the management console 118, which in turn notifies the VMs and/or VMM 106.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to provide information regarding various data object types to storage provider 121 for populating data structure 121A.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314. The configuration information may include the information that is stored in data structure 121A described above in detail.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 107, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
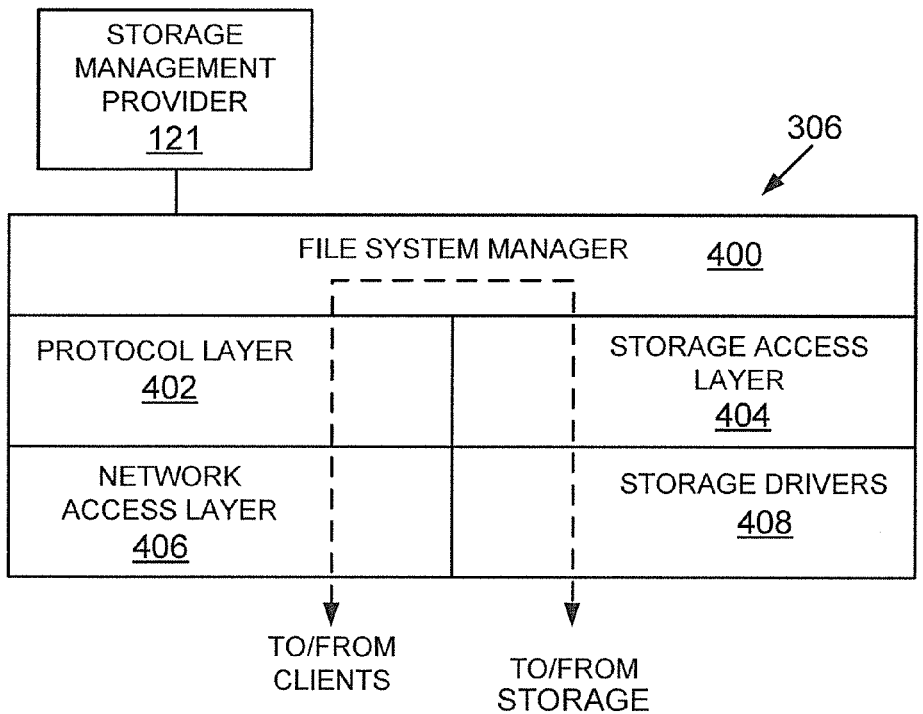
FIG. 4 shows an example of a storage operating system, used according to one aspect.

Operating System:

FIG. 4 illustrates a generic example of storage operating system 306 (or 107, FIG. 1A) executed by node 208.1, according to one aspect of the present disclosure. The storage operating system 306 maintains information regarding various storage devices, storage volumes, aggregates, qtrees and shares. The information is provided to storage provider 121, as described above in detail.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
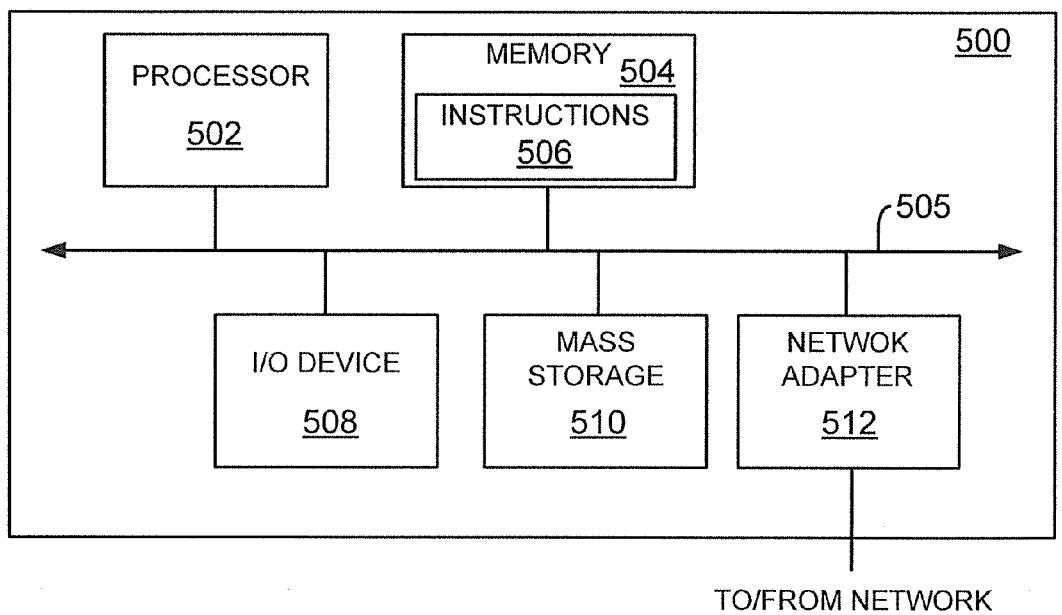
FIG. 5 shows an example of a processing system, used according to one aspect.

Processing System:

FIG. 5 is a high-level block diagram showing an example of the architecture of a processing system 500 that may be used according to one aspect. The processing system 500 can represent storage provider 121, management console 118, client 104 or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services. Details regarding these layers are not germane to the aspects disclosed herein.

Thus, a method and apparatus for presenting and managing storage have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

generating a quota report by a storage system that manages storage space for storage shares, wherein storage shares are selectively presented by a storage provider associated with storage sub-volume units that are part of a hierarchical logical structure having a storage volume managed by the storage system and at least a file share associated with one of the storage sub-volume units for storing data; wherein the quota report shows an assigned quota for each storage share and actual storage used by each storage share, and wherein each storage share is identified by a share name and includes a storage path for accessing storage space associated with each storage share;

filtering the quota report by the storage provider based only on storage shares that are managed and presented by the storage provider based on storage sub-volume units, the storage provider comprising a first interface to communicate with a plurality of virtual machines via a management console and a second interface to communicate with the storage system for obtaining the quota report;

monitoring storage space used for an assigned quota for a storage share presented by the storage provider and associated with a storage sub-volume unit, the assigned quota indicating storage space for the storage share and defining one or more attributes for the storage share, wherein the one or more attributes include de-duplication, mirroring and backup;

modifying the assigned quota for the storage share based on a client request for a storage service level for the client, where a higher storage service level for the storage share associated with the storage sub-volume unit has a greater number of the one or more attributes than a lower service level; and notifying the storage system of the modification.

2. The method of claim 1, wherein the storage provider presents the storage shares to the management console that presents the storage shares to the plurality of virtual machines.

3. The method of claim 2, comprising: receiving the request for modifying the quota from the management console.

4. The method of claim 2, wherein the management console presents the storage shares to a virtual machine monitor that presents the storage shares to the plurality of virtual machines.

5. The method of claim 1, wherein quota for the storage share is increased based on a service level for a virtual machine.

6. The method of claim 1, wherein quota for the storage share is decreased based on a service level for a virtual machine.

7. The method of claim 1, wherein the storage shares are based on the Common Internet File System (CIFS) protocol.

8. A system for managing storage shares in a virtual environment having a plurality of virtual machines, comprising:

a processor for a storage system for managing storage space for the storage shares and generating a quota report, wherein the quota report shows an assigned quota for each storage share and actual storage used by each storage share, and wherein the assigned quota indicates an amount of designated storage space for each storage share; and a processor for a storage provider for obtaining the quota report from the storage system and filtering the quota report based only on storage shares that are managed by the storage provider, the storage provider comprising a first interface to communicate with a plurality of virtual machines via a management console and a second interface to communicate with the storage system, wherein storage shares are selectively presented by the storage provider associated with storage sub-volume units that are part of a hierarchical logical structure having a storage volume managed by the storage system and at least a file share associated with one of the storage sub-volume units for storing data;

wherein the storage provider monitors storage space used for an assigned quota for a storage share presented by the storage provider and associated with a storage sub-volume unit, the assigned quota indicating storage space for the storage share and defining one or more attributes for the storage share, wherein the one or more attributes include de-duplication, mirroring and backup and modifies the assigned quota for the storage share based on a client request for a storage service level for the client, where a higher storage service level for the storage share associated with the storage sub-volume unit has a greater number of the one or more attributes than a lower service level and notifies the storage system of the modification.

9. The system of claim 8, wherein the storage provider presents the storage shares to the management console that presents the storage shares to the plurality of virtual machines.

10. The system of claim 9, wherein the management console sends the request for modifying the quota.

11. The system of claim 8, wherein quota for the storage share is increased based on a service level for a virtual machine.

12. The system of claim 8, wherein quota for the storage share is decreased based on a service level for a virtual machine.

13. The system of claim 8, wherein the storage shares are based on the Common Internet File System (CIFS) protocol.

14. A non-transitory, machine readable medium having stored thereon instructions for performing a method for managing storage shares in a virtual environment having a plurality of virtual machines, comprising machine executable code which when executed by at least one machine, causes the machine to:

generate a quota report by a storage system that manages storage space for storage shares, wherein storage shares are selectively presented by a storage provider associated with storage sub-volume units that are part of a hierarchical logical structure having a storage volume managed by the storage system and at least a file share associated with one of the storage sub-volume units for storing data; wherein the quota report shows an assigned quota for each storage share and actual storage used by each storage share, and wherein each storage share is identified by a share name and includes a storage path for accessing storage space associated with each storage share;

filter the quota report by the storage provider based only on storage shares that are managed and presented by the storage provider based on storage sub-volume units, the storage provider comprising a first interface to communicate with a plurality of virtual machines via a management console and a second interface to communicate with the storage system for obtaining the quota report;

monitor storage space used for an assigned quota for a storage share presented by the storage provider and associated with a storage sub-volume unit, the assigned quota indicating storage space for the storage share and defining one or more attributes for the storage share, wherein the one or more attributes include de-duplication, mirroring and backup;

modify the assigned quota for the storage share based on a client request for a storage service level for the client, where a higher storage service level for the storage share associated with the storage sub-volume unit has a greater number of the one or more attributes than a lower service level; and notify the storage system of the modification.

15. The storage medium of claim 14, wherein quota for the storage share is decreased or increased based on a service level for a virtual machine.

16. The storage medium of claim 14, wherein the storage provider presents the storage shares to the management console that presents the storage shares to the plurality of virtual machines.

17. The storage medium of claim 16, wherein the request for modifying the quota is received from the management console.

18. The storage medium of claim 14, wherein the management console presents the storage shares to a virtual machine monitor that presents the storage shares to the plurality of virtual machines.

19. The storage medium of claim 14, wherein the storage shares are based on the Common Internet File System (CIFS) protocol.

* * * * *